Patented Mar. 8, 1932

1,848,659

UNITED STATES PATENT OFFICE

HAROLD R. RAFTON, OF LAWRENCE, MASSACHUSETTS, ASSIGNOR TO RAFFOLD PROCESS CORPORATION, A CORPORATION OF MASSACHUSETTS

MANUFACTURE OF PAPER

No Drawing. Application filed April 8, 1929, Serial No. 353,668. Renewed July 28, 1931.

My invention relates to the manufacture of sized paper filled with carbonate filler.

The principal object of my invention is the manufacture of such paper employing a breakable paraffin emulsion.

An important object of my invention is the employment in such paper of a saponaceous paraffin emulsion which may be precipitated in the beater by a precipitant such as alum.

A further object is the manufacture of such paper using a saponaceous paraffin emulsion particularly of the kind where rosin is the emulsifying agent.

A further object is the production in the beater of a precipitate of alum and paraffin emulsion which is substantially unaffected by the carbonate filler within the time limits of the treatment that the fiber ordinarily receives in the manufacture of paper.

Other objects and advantages of my invention will become apparent during the course of the following description.

In my copending applications Serial Nos. 304,170; 304,173; 304,176, and 304,177, all filed September 5th, 1928, I have disclosed methods wherein paraffin emulsions are employed in the sizing of paper filled with carbonate fillers. In said applications the methods disclosed were such that intimacy and/or time of contact between the carbonate filler and the alum or the alum-sodium resinate or the like precipitate was substantially limited; or if the intimacy and/or time of contact had already resulted in deteriorating the effect of the alum or the alum precipitate this effect was substantially restored under the conditions where the intimacy and/or time of contact with the carbonate filler was substantially limited.

In my copending application Serial No. 262,030, filed March 15th, 1928, I have disclosed a method for sizing carbonate filled paper in the beater wherein a paraffin emulsion is employed and flocculated—i. e. broken—by carbonate filler, and wherein in one variation thereof alum is employed thereafter.

I have also discovered a modification of that process wherein a breakable paraffin emulsion, such for instance as a saponaceous paraffin emulsion (i. e. a paraffin emulsion made with a saponaceous emulsifying agent) is thrown down—i. e. broken—by the action of an acidic precipitant such as alum instead of by carbonate filler.

I have found that the precipitate produced by an acidic precipitant such as alum with a breakable paraffin emulsion, which for example in the case of a saponaceous paraffin emulsion may be considered to be an aluminum soap associated with paraffin, may be used in sizing paper filled with carbonate filler as the precipitate is affected only very slowly by the action of carbonate filler, in fact so slowly that in the lengths of time ordinarily employed, it is not ordinarily affected thereby sufficiently to interfere with its practical use.

I employ in the manufacture of my paper a breakable paraffin emulsion such as a saponaceous paraffin emulsion in such an amount that, when it is thrown down by an acidic precipitant such as alum, it is sufficient to impart the desired degree of sizing to my paper. It should be noted that the type of paper I desire to produce is a sized paper, and my paper is similar to, and by ordinary cursory observation cannot be readily distinguished from ordinary rosin sized filled papers. When I speak of the paper as sized I means resistant to ordinary aqueous writing ink, in varying degree according to the degree of sizing. My paper is entirely distinct from paraffin paper, or papers containing a relatively higher percentage of paraffin than that used for sizing. Such papers may have a paraffin finish or be translucent or even transparent, and waterproof, but my paper does not partake of these characteristics.

In the preferred practice of my invention I add to the fibrous material in the beater or like machine a suitable amount of breakable paraffin emulsion, for example saponaceous paraffin emulsion, allow a sufficient time for mixing, and then add a quantity of alum at least sufficient to completely throw down the said emulsion, although usually more will be added as is customary in regular papermaking procedure. I then add carbonate filler. If the carbonate filler be added prior to the addition of the saponaceous paraffin emulsion and/or the alum, this will result in a prior flocculation of the emulsion by the carbonate filler as described in my above last referred to prior application. This latter procedure seems to require in certain cases a somewhat greater amount of emulsion to produce the same sizing effect, so in my present invention I preferably introduce the carbonate filler after the precipitation of the emulsion by the alum has taken place. Of course this is not always feasible especially when broke containing carbonate filler is used in the furnish, but in such case such broke may be added if desired prior to addition of the alum, and the remainder of the carbonate filler subsequent thereto. There is described below in this specification a suitable procedure which may be employed in this case. Coloring matter or other material may also be added as is customary in the beater.

After sufficient treatment in the beater, the mix may be passed through the subsequent chests and treating apparatus, up to the point where it is diluted preparatory to introduction to the web-forming device of the paper machine. It is then diluted, formed into a web, and passed through the usual drying and finishing machinery of the paper machine. The resulting paper may be further finished by the customary auxiliary machines if desired.

My paper is suitable for use for any purposes to which sized paper may be customarily put, such as for printing or the like, and may be employed for further conversion, as for the manufacture of coated paper.

My invention may be practiced with any of the customary fibrous materials, such as mechanical and/or chemical pulps, and also with re-worked pulps such as old paper stock.

My method permits of sizing papers filled with carbonate filler in the beater by the use of a relatively inexpensive paraffin emulsion. The procedure for sizing such paper is similar to that used for sizing paper filled with ordinary fillers such as clay. My method is a convenient and economical one to use and will thus find relatively less difficulty in introduction into mills than will methods for sizing carbonate filled paper which depart from ordinary sizing practice.

The breakable paraffin emulsions that I employ may be defined as emulsions breakable—i. e. precipitable—by the addition of an acidic material, such for example as alum. One example of such an emulsion is paraffin dispersed in an aqueous dispersion agent such as in a solution of sodium silicate, and made in a known manner. The precipitate produced by alum in such case can be considered to consist substantially of aluminum silicate associated with paraffin, which is effected by the action of alkaline filler only very slowly, so slowly in fact that in the lengths of time ordinarily employed, it is not ordinarily affected thereby sufficiently to interfere with its practical use, and it is thus incorporated into the finished paper substantially unchanged. In such an emulsion as described above, it may be desirable at times to incorporate other materials in association with the paraffin as the disperse phase, such as rosin, Montan wax or the like.

Another example of a breakable paraffin emulsion is a saponaceous paraffin emulsion. As explained above the precipitate produced by alum may in this case be considered to be an aluminum soap associated with paraffin. The saponaceous paraffin emulsions which I have found suitable may be made with a variety of saponaceous emulsifying agents, e. g. sodium stearate, rosin size, or the like. However, while I do not restrict myself thereto, I prefer to use rosin size as the emulsifying agent, because it is practically the cheapest of the light colored saponifiable materials. However at times a mixture of saponifiable materials may be used to advantage, for example rosin and Montan wax, the latter preferably in a minor percentage. Moreover those saponaceous emulsions in which a relatively large proportion of emulsifying agent is employed are relatively more stable and less likely to deposit paraffin, which may be a source of trouble at times, hence it is preferable to employ saponaceous emulsions in which the proportion of emulsifying agent used is relatively large.

The saponaceous paraffin emulsions which I employ may be made in a variety of known ways, as for example in a machine suitable for intimate mixing, such as a colloid mill or homogenizer, or the like. A suitable method is to melt together the saponifiable material, such as the rosin, with the paraffin, and then intimately mix the fluxed mass with an aqueous solution of an alkaline material, particularly a compound or compounds of an alkali metal, such for example as sodium. One suitable compound is sodium silicate; another is sodium hydroxide. If a colloid mill is to be used, proportionate quantities of the heated melt and the preferably heated alkaline solution, preferably in continuous streams are directed into the orifice of the mill, from the exit of which issues the finished emulsion. The action of the alkaline material is to saponify or partially saponify the saponifiable material such as the rosin, and the paraffin is emulsified probably simultaneously. The rosin exists in the emulsion in the form of rosin size. When sodium hydroxide is used as the alkaline material a suitable amount has been found to be about seven per cent. of sodium hydroxide by weight based on the total weight of paraffin and rosin used. Although this percentage has been found to hold approximately correct even for a considerable variation in the relative proportions of rosin and paraffin present, I do not restrict myself thereto as it may be widely varied. The concentration of the alkaline solution may be such that the final emulsion issuing from the colloid mill may have as in one case found satisfactory, a concentration of 30 per cent. solids, although this percentage may vary widely and is in no sense restrictive. The proportion of saponifiable material such as rosin to paraffin is subject to wide variation and I therefore do not restrict myself to any definite proportions. However I have found, for example, that a 30 parts paraffin-70 parts rosin emulsion works satisfactorily, as does also an 18 parts paraffin-82 parts rosin.

The above examples are illustrative only and not restrictive. Nor do I restrict myself to the above method of processing the emulsion as it will be understood by one skilled in the art that any other known method producing a substantially equivalent emulsion will be suitable.

In regard to the flocculation or breaking of a saponaceous paraffin emulsion by carbonate filler, I have found that the emulsions which contain only substantially sufficient saponaceous emulsifying agent to emulsify the paraffin are in general more sensitive to breaking by carbonate filler than those emulsions containing a large excess of saponaceous emulsifying agent. The emulsions, particularly of the latter group, although relatively less sensitive than the former, appear to have their sensitivity increased with increase of dilution. I have found that this sensitivity in dilute solution can be considerably reduced by the addition of an alkaline material, for example sodium hydroxide, and this provides a method whereby in some cases, carbonate filler or broke containing same may be added to a beater in contact with a saponaceous paraffin emulsion prior to the alum, and the flocculation of the emulsion by said carbonate filler prior to the addition of the alum may be inhibited if not entirely prevented by the presence of sufficient alkali.

An illustrative formula suitable for practicing my invention is as follows:

|  | Pounds |
|---|---|
| Fibrous material (e. g. half sulphite and half soda pulp, air dry basis) | 1700 |
| Breakable paraffin emulsion, e. g. saponaceous paraffin emulsion, (dry basis) | 40 |
| Alum | 60 |
| Carbonate filler (e. g. calcium carbonate magnesium hydroxide, dry basis) | 300 |

Another illustrative formula is:

|  | Pounds |
|---|---|
| Fibrous material (e. g. equal parts of sulphite pulp, soda pulp, and old paper stock, air dry basis) | 1760 |
| Breakable paraffin emulsion, e. g. saponaceous paraffin emulsion (dry basis) | 40 |
| Alum | 75 |
| Carbonate filler (e. g. calcium carbonate magnesium hydroxide, dry basis) | 240 |

The paraffin emulsion referred to in the above formulæ is a 70 parts rosin-30 parts paraffin emulsion, and in this instance 2 per cent. on the combined weight of fiber and filler is employed.

There may be certain cases in the practice of my invention where conditions will be such as to cause a certain deterioration of the alum-emulsion precipitate by the carbonate filler, such for instance as would be the case if the time and/or intimacy of contact with the carbonate filler were excessive. In such cases it may be desirable to use extra alum added to the mix at or subsequent to its point of dilution prior to delivery to the web-forming device of the paper machine, in other words, at the wet end of the paper machine. In some cases where coated broke is employed, this practice may aid in suppression of foam. In some cases even where no apparent deterioration of the sizing has occurred, this practice may appreciably improve the sizing effect of the alum-emulsion precipitate. Or it may be desirable to introduce the carbonate filler at the wet end of the paper machine, either in whole or in part, and of course both of these practices can be combined, if desired,—namely the carbonate filler (either in whole or in part) and the alum (either in whole or in part) may both be added at the wet end of the paper machine, in this latter case the alum being preferably added prior to the carbonate filler.

Another variation is when the emulsion preferably in dilute form may itself be added to the fibrous material at the wet end of the paper machine, either alone or together with the carbonate filler (preferably followed thereby) and/or the alum, the alum being added preferably before the carbonate filler; or the emulsion may be added in the beater and all the alum at the wet end of the paper machine, in which case the carbonate filler may be added preferably at the wet end of the paper machine preferably after the addition of the alum. Of course any addition to the mix at the wet end of the paper machine should be made preferably proportionately and preferably continuously, preferably in such a manner as to allow independent incorporation of each individual ingredient with the mix, providing more than one ingredient is added.

I have found that in place of alum as a precipitant for the emulsion, I may use with a certain measure of success certain acidic materials such as sulphuric acid ($H_2SO_4$) or acid salts such as sodium bisulphate ($NaHSO_4$), or other salts of aluminum, as the chloride or the like, or the double salts which are the true alums; but because of its economy and of its general efficiency, I prefer to use the ordinary sulphate of aluminum, commonly called "alum". Any of the ordinary grades of alum, such as normal or basic, may be used satisfactorily.

By the term "carbonate filler" I mean filler which when agitated in contact with freshly boiled distilled water, say for an hour, will impart a pH value to such water greater than 7.0, that is, which will be on the alkaline side of the neutral point, and which will give off carbon dioxide gas when brought into contact with an equeous mineral acid, e. g. hydrochloric acid. Among fillers included in this group may be mentioned calcium carbonate, of which lime mud from the causticizing process is one form; calcium carbonate magnesium basic carbonate employed in the paper disclosed in my United States Patent No. 1,595,416, issued August 10, 1926; calcium carbonate magnesium hydroxide disclosed in my United States Patent No. 1,415,391, issued May 9, 1922; and other substantially water insoluble normal or basic carbonates of alkaline earth metals, (which expression is herein intended to include magnesium), or compounds, double salts, or physically associated mixtures of these with one or more other acid soluble materials of a substantially water insoluble nature. It should be stated that any given filler of the type referred to is not necessarily of uniform particle size; nor are the average particle sizes of the fillers necessarily alike, as some of the fillers of the type referred to have relatively coarse grain particles, whereas others are much more finely divided, and some are so finely divided that they may be said to approach or be in the colloidal condition.

By the term "carbonate filler" I also intend to include fibrous material and/or other material such as paper coating constituents or the like containing one or more compounds of the character referred to, such as "old papers" or similar papers, "broke", or the like.

By the term "old paper stock", I mean to include deinked papers, either bleached or not as desired, such as are commonly used for example in book and magazine paper furnishes. This material may contain filler such for example as clay which of course would vary in amount with the source and kind of old papers deinked and the particular modification of the deinking process used.

By the word "paraffin", I mean paraffin wax, which is solid at ordinary or room temperature. I do not mean to restrict myself only to the paraffin hydrocarbons, but mean to include in this word all the hydrocarbons of a waxy nature substantially unsaponifiable and inert to acidic and alkaline materials under ordinary conditions of temperature and pressure, whether derived from petroleum, shale, lignite, earth wax, or other natural or artificial sources. I do not, however, mean to include in this term material of a pitchy nature.

When I use the word "paper" herein, I use it in the broad sense to include products of manufacture of all types and of all weights and thicknesses, which contain as an essential constituent a considerable amount of prepared fiber and which are capable of being produced on a Fourdrinier, cylinder, or other forming, or felting, or shaping, or molding machine.

By the term "wet end of the paper machine" I intend to include those instrumentalities employed in paper manufacture by which and/or in which a relatively concentrated paper mix is diluted, and treated, conveyed or fed up to the point of web-formation, such as the mixing box, regulating and proportioning devices, rifflers, troughs, screens, head boxes, inlets, and the like, including also instrumentalities used in the white water cycle.

When I use the word "rosin" I mean to include not only the natural material, but also any synthetic resin acid or acids.

When I use the term "rosin size" I mean to include any material produced by the action of an alkaline substance, generally in aqueous solution, on rosin, regardless of the exact composition of the product, or the degree of saponification or the varying composition which different samples may possess.

When I use the term "alkali metal" I mean to include the hypothetical alkali metal ammonium.

While I have described in detail the preferred practice of my process it is to be understood that the details of procedure, the proportions of ingredients, and arrangement of steps may be widely varied without departing from the spirit of the invention or the scope of the subjoined claims.

I claim:

1. The method of manufacturing sized paper filled with carbonate filler comprising mixing fibrous material, breakable paraffin emulsion, an acidic precipitant for said emulsion, and carbonate filler, and thereafter making paper therefrom.

2. The method of manufacturing sized paper filled with carbonate filler comprising mixing fibrous material, breakable paraffin emulsion, an acidic precipitant for said emulsion comprising alum, and carbonate filler, and thereafter making paper therefrom.

3. The method of manufacturing sized paper filled with carbonate filler comprising mixing fibrous material, saponaceous paraffin emulsion, an acidic precipitant for said emulsion, and carbonate filler, and thereafter making paper therefrom.

4. The method of manufacturing sized paper filled with carbonate filler comprising mixing fibrous material, saponaceous paraffin emulsion, the emulsification of said emulsion having been effected with the aid of alkaline material, an acidic precipitant for said emulsion, and carbonate filler, and thereafter making paper therefrom.

5. The method of manufacturing sized paper filled with carbonate filler comprising mixing fibrous material, saponaceous paraffin emulsion, the emulsification of said emulsion having been effected with the aid of an alkaline compound of an alkali metal, an acidic precipitant for said emulsion, and carbonate filler, and thereafter making paper therefrom.

6. The method of manufacturing sized paper filled with carbonate filler comprising mixing fibrous material, saponaceous paraffin emulsion, the emulsification of said emulsion having been effected with the aid of an alkaline compound of sodium, an acidic precipitant for said emulsion, and carbonate filler, and thereafter making paper therefrom.

7. The method of manufacturing sized paper filled with carbonate filler comprising mixing fibrous material, saponaceous paraffin emulsion, the emulsification of said emulsion having been effected with the aid of sodium hydroxide, an acidic precipitant for said emulsion, and carbonate filler, and thereafter making paper therefrom.

8. The method of manufacturing sized paper filled with carbonate filler comprising mixing fibrous material, saponaceous paraffin emulsion, an acidic precipitant for said emulsion comprising alum, and carbonate filler, and thereafter making paper therefrom.

9. The method of manufacturing sized paper filled with carbonate filler comprising mixing fibrous material, rosin size-paraffin emulsion, an acidic precipitant for said emulsion, and carbonate filler, and thereafter making paper therefrom.

10. The method of manufacturing sized paper filled with carbonate filler comprising mixing fibrous material, rosin size-paraffin emulsion, an acidic precipitant for said emulsion comprising alum, and carbonate filler, and thereafter making paper therefrom.

11. The method of manufacturing sized paper filled with carbonate filler comprising mixing fibrous material, saponaceous rosin-Montan wax-paraffin emulsion, an acidic precipitant for said emulsion comprising alum, and carbonate filler, and thereafter making paper therefrom.

12. The method of manufacturing sized paper filled with carbonate filler comprising mixing fibrous material comprising sulphite and soda pulps, saponaceous paraffin emulsion, an acidic precipitant for said emulsion comprising alum, and carbonate filler, and thereafter making paper therefrom.

13. The method of manufacturing sized paper filled with carbonate filler comprising mixing fibrous material comprising sulphite pulp, soda pulp and old paper stock, saponaceous paraffin emulsion, alum, and carbonate filler, and thereafter making paper therefrom.

14. The method of manufacturing sized paper filled with carbonate filler comprising mixing fibrous material, saponaceous paraffin emulsion, an acidic precipitant for said emulsion comprising alum, and carbonate filler comprising alkaline earth metal carbonate, and thereafter making paper therefrom.

15. The method of manufacturing sized paper filled with carbonate filler comprising mixing fibrous material, saponaceous paraffin emulsion, an acidic precipitant for said emulsion comprising alum, and carbonate filler comprising calcium carbonate, and thereafter making paper therefrom.

16. The method of manufacturing sized paper filled with carbonate filler comprising mixing fibrous material, saponaceous paraffin emulsion, alum, and carbonate filler comprising calcium carbonate and magnesium compound, and thereafter making paper therefrom.

17. The method of manufacturing sized paper filled with carbonate filler comprising mixing fibrous material, saponaceous paraffin emulsion, alum, and carbonate filler comprising calcium carbonate magnesium hydroxide, and thereafter making paper therefrom.

18. The method of manufacturing sized paper filled with carbonate filler comprising mixing in the beater fibrous material, saponaceous paraffin emulsion, an acidic precipitant for said said emulsion comprising alum, and carbonate filler, and thereafter making paper therefrom.

19. The method of manufacturing sized paper filled with carbonate filler comprising mixing in the beater fibrous material, saponaceous paraffin emulsion, alum, and carbonate filler, and adding a subsequent quantity of alum at the wet end of the paper machine, and thereafter making paper therefrom.

20. In a method of manufacturing paper filled with carbonate filler the step of precipitating with alum a breakable paraffin emulsion.

21. A sized paper comprising fibrous material, carbonate filler, and the precipitate produced by the action of alum on breakable paraffin emulsion.

22. A sized paper comprising fibrous material, carbonate filler, and the precipitate produced by the action of acidic material on saponaceous paraffin emulsion.

23. A sized paper comprising fibrous material, carbonate filler, and the precipitate produced by the action of acidic material on rosin size-paraffin emulsion.

24. A sized paper comprising fibrous material, carbonate filler, and the precipitate produced by the action of alum on saponaceous rosin-Montan wax-paraffin emulsion.

25. A sized paper suitable for coating comprising fibrous material including old paper stock, carbonate filler, paraffin and the precipitate produced by the action of alum on rosin size.

26. The method of manufacturing sized paper filled with carbonate filler comprising mixing fibrous material, breakable paraffin emulsion, and an acidic precipitant for said emulsion, subsequently adding carbonate filler to the mix, and thereafter making paper therefrom.

27. The method of manufacturing sized paper filled with carbonate filler comprising mixing fibrous material, breakable paraffin emulsion, and alum, subsequently adding carbonate filler to the mix, and thereafter making paper therefrom.

28. The method of manufacturing sized paper filled with carbonate filler comprising mixing fibrous material, saponaceous paraffin emulsion, and an acidic precipitant for said emulsion, subsequently adding carbonate filler to the mix, and thereafter making paper therefrom.

29. The method of manufacturing sized paper filled with carbonate filler comprising mixing fibrous material, saponaceous paraffin emulsion, the emulsification of said emulsion having been effected with the aid of alkaline material, and an acidic precipitant for said emulsion, subsequently adding carbonate filler to the mix, and thereafter making paper therefrom.

30. The method of manufacturing sized paper filled with carbonate filler comprising mixing fibrous material, saponaceous paraffin emulsion, the emulsification of said emulsion having been effected with the aid of an alkaline compound of an alkali metal, and an acidic precipitant for said emulsion, subsequently adding carbonate filler to the mix, and thereafter making paper therefrom.

31. The method of manufacturing sized paper filled with carbonate filler comprising mixing fibrous material, saponaceous paraffin emulsion, the emulsification of said emulsion having been effected with the aid of an alkaline compound of sodium, and an acidic precipitant for said emulsion, subsequently adding carbonate filler to the mix, and thereafter making paper therefrom.

32. The method of manufacturing sized paper filled with carbonate filler comprising mixing fibrous material, saponaceous paraffin emulsion, the emulsification of said emulsion having been effected with the aid of sodium hydroxide, and an acidic precipitant for said emulsion, subsequently adding carbonate filler to the mix, and thereafter making paper therefrom.

33. The method of manufacturing sized paper filled with carbonate filler comprising mixing fibrous material, saponaceous paraffin emulsion, and alum, subsequently adding carbonate filler to the mix, and thereafter making paper therefrom.

34. The method of manufacturing sized paper filled with carbonate filler comprising mixing fibrous material, rosin size-paraffin emulsion, and an acidic precipitant for said emulsion, subsequently adding carbonate filler to the mix, and thereafter making paper therefrom.

35. The method of manufacturing sized paper filled with carbonate filler comprising mixing fibrous material, rosin size-paraffin emulsion, and alum, subsequently adding carbonate filler to the mix, and thereafter making paper therefrom.

36. The method of manufacturing sized paper filled with carbonate filler comprising mixing fibrous material, saponaceous rosin-Montan wax-paraffin emulsion, and alum, subsequently adding carbonate filler to the mix, and thereafter making paper therefrom.

37. The method of manufacturing sized paper filled with carbonate filler comprising mixing fibrous material comprising sulphite and soda pulps, saponaceous paraffin emulsion, and alum, subsequently adding carbonate filler to the mix, and thereafter making paper therefrom.

38. The method of manufacturing sized paper filled with carbonate filler comprising mixing fibrous material comprising sulphite pulp, soda pulp and old paper stock, saponaceous paraffin emulsion, and alum, subsequently adding carbonate filler to the mix, and thereafter making paper therefrom.

39. The method of manufacturing sized paper filled with carbonate filler comprising mixing fibrous material, saponaceous paraffin emulsion, and alum, subsequently adding to the mix carbonate filler comprising alkaline earth metal carbonate, and thereafter making paper therefrom.

40. The method of manufacturing sized paper filled with carbonate filler comprising mixing fibrous material, saponaceous paraffin emulsion, and alum, subsequently adding carbonate filler comprising calcium carbonate to the mix, and thereafter making paper therefrom.

41. The method of manufacturing sized paper filled with carbonate filler comprising mixing fibrous material, saponaceous paraffin emulsion, and alum, subsequently adding to the mix carbonate filler comprising calcium carbonate and magnesium compound, and thereafter making paper therefrom.

42. The method of manufacturing sized paper filled with carbonate filler comprising mixing fibrous material, saponaceous paraffin emulsion, and alum, subsequently adding to the mix carbonate filler comprising calcium carbonate magnesium hydroxide, and thereafter making paper therefrom.

43. The method of manufacturing sized paper filled with carbonate filler comprising mixing in the beater fibrous material, saponaceous paraffin emulsion and alum, subsequently adding carbonate filler to the mix, and thereafter making paper therefrom.

44. The method of manufacturing sized paper filled with carbonate filler, comprising mixing in the beater fibrous material, saponaceous paraffin emulsion and alum, subsequently adding carbonate filler to the mix, adding a subsequent quantity of alum at the wet end of the paper machine, and thereafter making paper therefrom.

45. In the manufacture of paper filled with alkaline filler wherein precipitable material is precipitated by acidic precipitant, the improvement which comprises imparting to the precipitate a resistance to the deteriorating alkaline influence of alkaline filler by means of material which is itself resistant to the alkalinity possessed by said alkaline filler.

46. In the manufacture of paper filled with alkaline filler wherein size is precipitated by acidic precipitant, the improvement which comprises imparting to the precipitated size a resistance to the deteriorating alkaline influence of alkaline filler by means of material which is itself resistant to the alkalinity possessed by said alkaline filler.

47. In the manufacture of paper filled with alkaline filler wherein saponaceous material is precipitated by acidic precipitant, the improvement which comprises imparting to the precipitated saponaceous material a resistance to the deteriorating alkaline influence of alkaline filler by means of material which is itself resistant to the alkalinity possessed by said alkaline filler.

48. In the manufacture of paper filled with alkaline filler wherein rosin size is precipitated by acidic precipitant, the improvement which comprises imparting to the precipitated rosin size a resistance to the deteriorating alkaline influence of alkaline filler by means of material which is itself resistant to the alkalinity possessed by said alkaline filler.

In testimony whereof I affix my signature.

HAROLD ROBERT RAFTON.